(12) United States Patent
Gustafsson

(10) Patent No.: US 11,035,097 B2
(45) Date of Patent: Jun. 15, 2021

(54) TRENCH CUTTING MACHINE

(71) Applicant: HUSQVARNA AB, Huskvarna (SE)

(72) Inventor: Pierre Gustafsson, Norrahammar (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 16/901,374

(22) Filed: Jun. 15, 2020

(65) Prior Publication Data
US 2020/0308806 A1 Oct. 1, 2020

Related U.S. Application Data

(63) Continuation of application No. 15/551,703, filed as application No. PCT/SE2016/050134 on Feb. 23, 2016, now Pat. No. 10,711,433.

(30) Foreign Application Priority Data

Feb. 23, 2015 (WO) ................. PCT/SE2015/050204

(51) Int. Cl.
*E02F 5/08* (2006.01)
*H02G 1/06* (2006.01)

(52) U.S. Cl.
CPC .................... *E02F 5/08* (2013.01); *H02G 1/06* (2013.01)

(58) Field of Classification Search
CPC ....... E02F 5/08; E02F 5/02; E02F 5/12; E02F 5/14; E01C 23/0933; H02G 1/06
See application file for complete search history.

(56) References Cited

U.S. PATENT DOCUMENTS

| 1,687,773 A | 10/1928 | Kahlen |
| 2,621,427 A | 12/1952 | Hulse |
| 2,879,814 A | 3/1959 | Scott |

(Continued)

FOREIGN PATENT DOCUMENTS

| FR | 2755632 A1 * | 5/1998 | ......... B23Q 11/0825 |
| FR | 2755632 A1 | 5/1998 | |

(Continued)

OTHER PUBLICATIONS

International Search Report and Written Opinion for International Application No. PCT/SE2015/050204 dated Nov. 27, 2015.

(Continued)

*Primary Examiner* — Jamie L McGowan
(74) *Attorney, Agent, or Firm* — Burr & Forman, LLP

(57) ABSTRACT

A trench cutting machine for making a cut in a surface. The trench cutting machine comprises a frame comprising at least one rear axle and at least one front axle and a rotatable circular blade mounted to the frame. The front axle is vertically adjustable relative to the frame between a first position where the circular blade is lifted clear of the surface, and a second position where the circular blade is arranged to extend downwards from the frame to cut a predetermined distance into the surface. The frame comprises an auxiliary front axle located in front of the axis of rotation of the circular blade, wherein the auxiliary front axle and the rear axle are arranged to support the frame on the surface during a cutting operation and to maintain a selected depth of cut.

19 Claims, 8 Drawing Sheets

(56) References Cited

U.S. PATENT DOCUMENTS

| | | | | |
|---|---|---|---|---|
| 3,319,365 A | * | 5/1967 | Perry | E02F 3/20 37/94 |
| 3,357,745 A | * | 12/1967 | Cooper | E01C 23/0933 299/39.3 |
| 3,722,496 A | | 3/1973 | Schuman | |
| 3,802,472 A | | 4/1974 | Morse | |
| 4,204,714 A | * | 5/1980 | Jacobson | B28D 1/181 299/1.5 |
| 4,503,630 A | | 3/1985 | Riley | |
| 4,939,854 A | * | 7/1990 | Boren | E02F 3/188 172/42 |
| 4,953,523 A | * | 9/1990 | Swan | B24B 7/188 125/14 |
| 4,958,457 A | * | 9/1990 | Doskocil | E02F 3/188 172/112 |
| 5,167,215 A | * | 12/1992 | Harding, Jr. | B23D 59/006 125/13.01 |
| 5,174,686 A | | 12/1992 | Raymond | |
| 5,235,753 A | * | 8/1993 | Stumpf | B27G 19/04 30/390 |
| 5,537,748 A | * | 7/1996 | Takahashi | B23D 59/006 30/124 |
| 5,564,205 A | * | 10/1996 | Smith | E02F 7/02 37/386 |
| 5,950,612 A | * | 9/1999 | Zuzelo | B28D 1/045 125/13.01 |
| 6,484,711 B2 | * | 11/2002 | Acker | B27B 9/02 125/13.01 |
| 6,557,261 B1 | * | 5/2003 | Buser | B23D 59/006 30/124 |
| 6,651,361 B1 | * | 11/2003 | Porter | E02F 3/241 172/42 |
| 7,089,671 B2 | | 8/2006 | Haneda et al. | |
| 7,207,115 B2 | | 4/2007 | Otake | |
| 7,469,694 B2 | * | 12/2008 | Howard | B27B 9/02 125/13.01 |
| 10,422,107 B2 | | 9/2019 | Sewell et al. | |
| 2005/0262706 A1 | | 12/2005 | Yoshida et al. | |
| 2007/0193039 A1 | | 8/2007 | Onose et al. | |
| 2009/0263195 A1 | | 10/2009 | Horan et al. | |
| 2011/0070030 A1 | | 3/2011 | Miller | |
| 2014/0334878 A1 | | 11/2014 | Miller | |
| 2016/0340139 A1 | | 11/2016 | Motz et al. | |
| 2018/0355563 A1 | * | 12/2018 | Dickson | E01C 23/0993 |

FOREIGN PATENT DOCUMENTS

| | | |
|---|---|---|
| GB | 2269613 A | 2/1994 |
| WO | 2010087200 A1 | 8/2010 |
| WO | 2014093625 A1 | 6/2014 |

OTHER PUBLICATIONS

International Search Report and Written Opinion for International Application No. PCT/SE2016/050134 dated May 24, 2016.
International Preliminary Report on Patentability for International Application No. PCT/SE2015/050204 dated Aug. 29, 2017.
International Preliminary Report on Patentability for International Application No. PCT/SE2016/050134 dated Aug. 29, 2017.

* cited by examiner

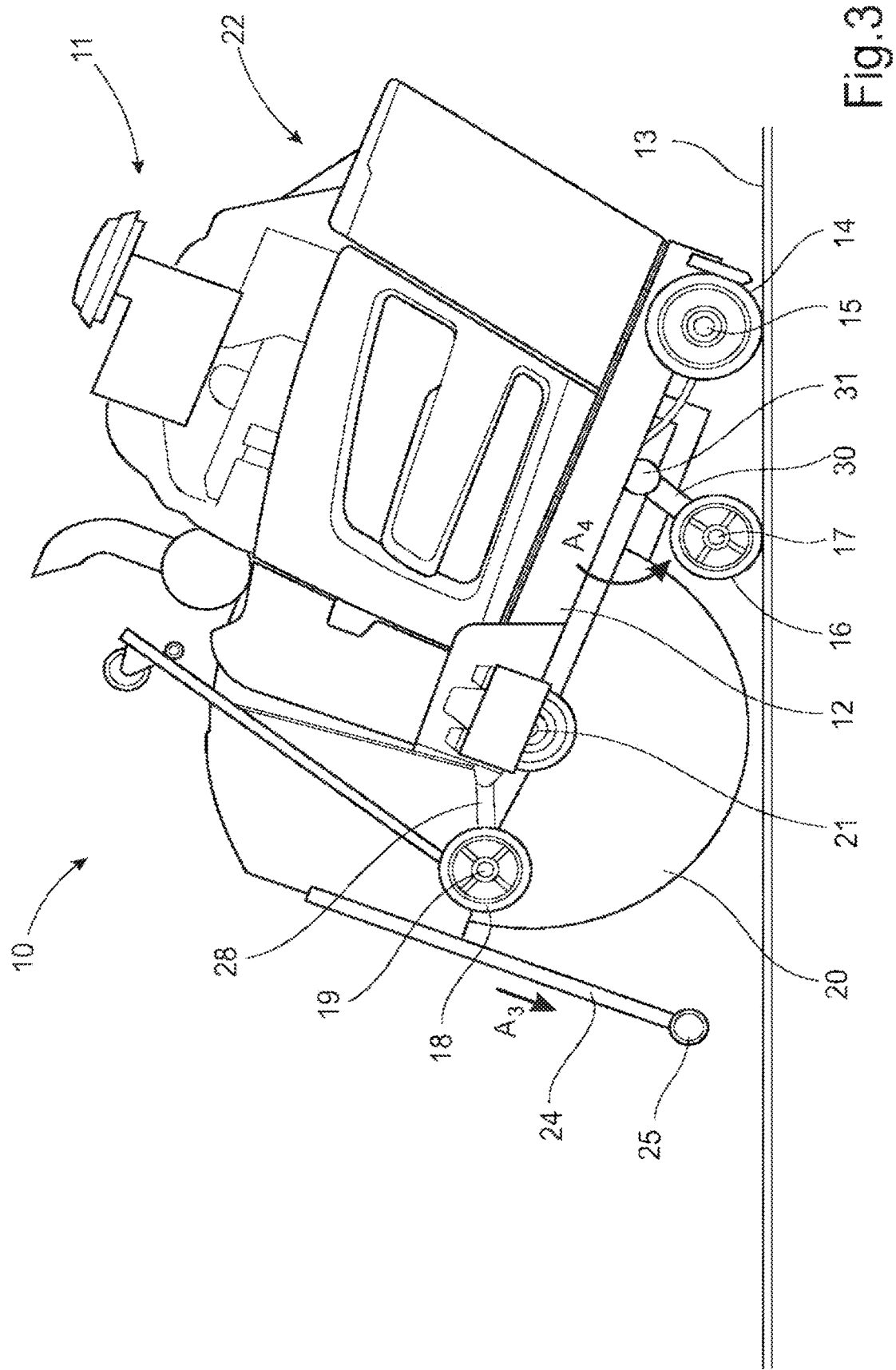

TRENCH CUTTING MACHINE

TECHNICAL FIELD

The present invention relates to a trench cutting machine for cutting a narrow trench prior to laying at least one flexible casing or tube, cable or wire, which trench cutting machine including a circular blade arrangement for cutting a trench into a surface that may comprise tarmac, concrete or similar. The invention further relates to a shroud assembly and a debris guiding device for such a trench cutting machine.

BACKGROUND ART

The use of trench cutting machines for laying flexible casings or tubes, e.g. for optical fibers, as well as cables or wires for electrical or other installations is becoming increasingly common. One reason for this is that a narrow trench make less damage on e.g. a road and therefore provides less environmental impact than a wider excavated channel. Furthermore, a narrow cut trench is much easier to cover and can be made almost invisible as if no trenching had been performed. Also, using a circular blade arrangement in a cutting operation makes the side walls of the trench less likely to collapse, since larger stones or roots are cut through. Finally, the material from the trench when using a blade arrangement becomes fine debris which more easily handled that excavated material.

When performing a cutting operation, the circular blade can be rotated in two alternative directions. A first direction involves rotating the circular blade in the same direction as the ground contacting wheels of the machine, which operation is commonly referred to as "down-cut". A problem with this operation is that cut debris is drawn backwards into the trench by the blade and will partially re-fill the trench unless steps are taken to remove the debris immediately after the circular blade. A second direction involves rotating the circular blade in the opposite direction as the ground contacting wheels of the machine, which operation is commonly referred to as "up-cut" In this case, the problem of debris gathering in the cut trench is reduced, but debris can be thrown out in front of the machine as the cutting teeth of the blade cuts through the surface. The latter is a particular problem when the circular blade begins its cut into the surface. Also, the cutting action of the blade can induce forces to the machine, which forces can make the machine unstable unless the weight on a rearmost axle of the machine is sufficient to counteract such forces.

Hence, there is a need for a trench cutting machine that solves the above problems. One object of the invention is to provide an improved trench cutting machine that can be operated in a stable manner during the entire cutting operation. A further object is to provide means for controlling the spread and deposition of debris during an up-cut operation.

DISCLOSURE OF INVENTION

The above problems are solved by a trench cutting machine as described in the attached claims.

In the subsequent text, the term "circular blade" denotes a blade assembly comprising one or more rotatable cutting blades mounted on a single axis, wherein the number of blades can be selected to achieve a vertical cut having a desired, predetermined width in a surface. Terms such as "front", "forwards", "rear" and "rearwards" are defined in relation to the direction of movement of the a trench cutting machine during a cutting operation. Furthermore, the term "up-cut" refers to a direction of rotation of the circular blade in the opposite direction as the ground contacting wheels of the machine, as defined above.

A circular blade for a trench cutting machine according to the invention can be in the form of a blade assembly for cutting into a work surface/area/structure. The blade assembly can preferably include at least two blades, a first blade, a second blade, and possible additional blades, that are axially aligned, each blade having a working portion at the periphery of the blade and a central portion around the axial center of the blade for being operated on by a device for driving the blade assembly. A blade support structure extends between the working portion and the central portion and the blades are spaced apart by a spacer structure/-s. The spacer structure/s forms at least one compartment, between the blades, that is in contact with the central portion and extending towards the working portion, and at least at one radius of the spacer structure/s covering a significant part of the periphery at that radius of the spacer structure/s, said compartment/s having an inlet at the central portion.

More preferably the blade assembly includes three blades which are spaced apart by two spacer structures, said spacer structures each forming at least one compartment between the blades in contact with the central portion and extending towards the working portion and at least at one radius of the spacer structures covering a significant part of the periphery at that radius of the spacer structures, said compartment/s having an inlet at the central portion. The actual number and design of the blades making up such a blade assemble is not relevant for the current invention per se.

The invention relates to a trench cutting machine for making a cut in a surface comprising pavement, concrete and/or other hard materials. The trench cutting machine comprises a first frame having at least one front axle and at least one rear axle, wherein at least one of the front and rear axles has two wheels. The front and/or rear axles can comprise a single axle with one wheel, a single axle extending across the frame between a pair of wheels, or a separate axle for each individual wheel. For an arrangement with a pair of wheels with separate axles on opposite sides of the frame, the central axes of both axles are coinciding. A rotatable circular blade is mounted to the frame, which circular blade has an axis of rotation located parallel to and in front of the front axle during a cutting operation. A prime mover is provided for driving at least the circular blade.

The front axle is vertically adjustable relative to the frame between a first position where the circular blade is lifted clear of the surface, and a second position where the circular blade is arranged to extend downwards from the frame to cut a predetermined distance into and under the surface. In the first position the front axle is arranged to support the frame on the surface. In the second position the front axle is arranged to be lifted clear of the surface, or at least merely rest on the surface without supporting the frame, as the weight of the front end of the machine is transferred to the auxiliary front axle.

The trench cutting machine further comprises an auxiliary front axle located in front of the axis of rotation of the circular blade, wherein the auxiliary front axle and the rear axle are arranged to support the frame on the surface during a cutting operation and to maintain a selected depth of cut into the surface. For this purpose the auxiliary front axle is located in front of the axis of rotation of the circular blade wherein moving the front axle from the first position into the second position causes the auxiliary front axle to come into frame supporting engagement, in which the auxiliary front axle (19) supports the frame (12) on the surface together with the rear axle and maintains a predetermined depth of cut. As described above, the auxiliary front axle can comprise an axle with one wheel, a single axle extending between a pair of wheels, or a separate axle for each individual wheel. The prime mover can be arranged to drive one or more wheels on any one of the above-mentioned axles.

The direction of rotation of the circular blade when cutting is opposite to the direction of rotation of the wheels during forward movement of the trench cutting machine. This direction of rotation is hereafter termed an up-cut.

As indicated above, at least one of the auxiliary front axle and the rear axle has two wheels. According to the invention, the wheel or wheels on the rear axle are preferably driven, as these will always be in contact with the ground. However, it is also possible to drive the wheel or wheels on either or both of the second and/or third axles.

The auxiliary front axle is preferably adjustable relative to the frame in order to set a predetermined depth of cut, which can correspond to a smaller depth of cut than a full depth of cut. According to one example, the auxiliary front axle can be adjustable about a pivot relative to the frame. For instance, the auxiliary front axle can be mounted at the end of a sub-frame or an arm extending forwards, in front of the frame. When the trench cutting machine is performing a cutting operation, the front portion of the frame is supported by the wheel or wheels on the auxiliary front axle. In this position, the sub-frame or arm extends in the direction of a line between and at right angles to the axis of the pivot and the axis of the auxiliary front wheel or wheels. During the cutting operation this line is located at a predetermined angle relative to the plane of the substantially plane surface. An actuator can be provided for adjusting the position of the sub-frame or arm prior to or during a cutting operation. The actuator can be controlled to act on the sub-frame or arm so that this angle is reduced, to increase the depth of cut, or increased, reduce the depth of cut. Alternatively, the auxiliary front axle can be adjustable along a straight line, at right angles to or at a predetermined angle relative to the main longitudinal direction of the frame. In this case the auxiliary front wheel can be mounted on a support at the front portion of the frame, which support is movable up and down for adjusting the position of the frame prior to or during a cutting operation. An actuator can be provided for adjusting the vertical position of the support relative to the plane of the substantially plane surface to give a desired depth of cut. According to a one example, the auxiliary front axle can be steplessly adjustable relative to the frame. Alternatively, the auxiliary front axle can be adjustable in fixed steps relative to the frame.

The positioning of the auxiliary front axle can be carried out by a suitable actuator mounted to the frame or a chassis carried by the frame and can be operated manually or by the prime mover. An actuator driven by the prime mover can comprise any suitable mechanically, hydraulically or electrically driven device and is controllable by an operator. Non-limiting examples of such suitable devices are e.g. ball-screw arrangement, hydraulic cylinders or electric servo motors. Unless it is desired to adjust the position of the sub-frame during a cutting operation, it can be advantageous that that actuator is self-locking or can be locked in a set position, in order to reduce the power output required from the prime mover to maintain the position. Alternatively, the actuator can be a suitable mechanical linkage or gearing that can be operated and set/locked manually be the operator.

Non-limiting examples of such suitable devices are e g a hand-wheel connected to a self-locking screw mechanism or a hand cranked lever system.

According to a further example, the auxiliary front axle can be fixed relative to the frame to set a predetermined depth of cut, for instance, corresponding to a full depth of cut. This arrangement can be used when the trench cutting machine will only be required to perform a cut at a constant depth, in which case the auxiliary front axle can be fixed during manufacture of the machine.

As described above, the auxiliary front axle comprises at least one wheel arranged adjacent the circular blade. The circular blade can be arranged on the left or the right hand side of the frame, while maintaining the same auxiliary front axle arrangement. Alternatively, the circular blade can be located along or adjacent the central longitudinal axis of the trench cutting machine. In this case the auxiliary front axle can have at least one wheel arranged on either side of the circular blade.

The auxiliary front axle is located a predetermined distance in front of the axis of rotation of the circular blade. This distance is dependent on the size of the machine and the diameter of the circular blade and is selected so that the the auxiliary front axle can counteract the torque produced the circular blade and prevent the wheel or wheels on the rear axle from slipping or lifting. The distance can also be selected so that at least one wheel on the auxiliary front axle is arranged in front of the outer periphery of the circular blade. According to the invention, the trench cutting machine is arranged to be supported by the wheels of the rear axle and the auxiliary front axle during a cutting operation. An advantage with this solution is that the trench cutting machine is stabilized, as the supporting auxiliary front axle prevents the wheels on the rear axle from slipping or being lifted during the cutting operation.

The trench cutting machine further comprises a shroud assembly mounted on the frame to guide debris discharged from the circular blade. The shroud assembly comprises a first and second opposed and spaced apart side walls joined along their rear, upper and front portions. The shroud assembly further has an open bottom portion and an at least partially open lower front portion. At least a portion of the circular blade is configured to be received within the shroud assembly. A movable front section is arranged at the front portion of the shroud assembly, which front section is arranged to cover the at least partially open lower front portion and to extend to a position adjacent or in contact with the surface during a cutting operation.

One or both side portions of the movable front section can be attached onto the shroud assembly by a guide means, such as a sliding guide or a roller guide, allowing it to slide relative to a front surface of the shroud as the distance between the surface and the lower portion of the shroud changes. For instance, the movable front section can be extended to its maximum extension in front of the shroud assembly when the frame is in its first position where the circular blade is lifted clear of the surface to allow transport of the machine. When the frame is lowered towards its second position, the movable front section can be arranged to reach the surface at substantially the same time as the circular blade. An advantage with this solution is that debris can be prevented from being thrown forward by the cutting action. As the circular blade is lowered downwards to cut a predetermined distance into the surface, the movable front section will slide relative to the front surface of the shroud as the distance between the surface and the lower portion of the shroud is reduced. In this way the movable front section can be arranged to extend to a position adjacent the surface during the entire cutting operation.

Alternatively, one or both side portions of the movable front section can be attached onto the shroud assembly by a part-circular guide or a pivot, allowing the front section to slide or be pivoted along a part-circular path relative to a front surface of the shroud as the distance between the surface and the lower portion of the shroud changes. For instance, the movable front section can be extended to its maximum extension in front of the shroud assembly when the frame is in its first position where the circular blade is lifted clear of the surface to allow transport of the machine. When the frame is lowered towards its second position, the movable front section can be arranged to reach the surface at substantially the same time as the circular blade. In this way debris can be prevented from being thrown forward by the cutting action. As the circular blade is lowered downwards to cut a predetermined distance into the surface, the movable front section will slide along or be pivoted relative to the front surface of the shroud as the distance between the surface and the lower portion of the shroud is reduced.

A lower end portion of the front section can be provided with a ground contacting member. The ground contacting member can comprise one or more rotatable members, such as wheels, in contact with the surface. Alternatively, the ground contacting member can comprise one or more low friction components with a suitable rounded or curved lower surface.

For additional control of the debris from the cutting operation, the shroud can be provided with a first deflector member is arranged behind the circular blade. The first deflector member extends transversely from the first side wall at least up to a recess in the second side wall. Preferably, the first deflector member extends from a relatively higher position at the first side wall to a relatively lower position at the second side wall. For instance, the deflector member can be arranged at an angle to form a downward angled surface from the first side wall towards the second side wall and its recess. Alternatively, the deflector member can be shaped as a curved surface suitable for guiding the debris towards the recess. A lower portion of the first deflector member adjacent the second side wall extends transversely outside the second side wall, and thus outside the cut made by the circular blade in the surface. An advantage with this solution is that debris can be prevented from falling back into the cut in the surface. To ensure this function, the first deflector member can extend a distance out through the recess in the second side wall. The first deflector member can be arranged to deposit debris on any one side of the cut.

According to a further example, a second deflector member can be arranged spaced from the first deflector member and facing the outer surface of the second side wall. The second deflector member extends away from the second side wall from a position above the recess and downwards past the end of the first deflector member. In its simplest form the second deflector member comprises a single angled surface extending downwards in front of the recess and below a lower portion of the first deflector member. Alternatively, the recess in the second side wall can be partially enclosed by a second deflector member in the form of a receptacle mounted on the outer surface of the second side wall. The receptacle can have an upper wall, an outer wall as well as a front and a rear wall. Debris exiting the recess along the first deflector member will be prevented from being thrown out of the recess in an uncontrollable manner as it will strike one or more walls of the receptacle before falling out through the open bottom of the receptacle.

The invention further relates to a shroud assembly for a trench cutting machine, which shroud assembly is arranged to guide debris discharged from a circular blade of the trench cutting machine. The shroud assembly comprising a first and second opposed and spaced apart side walls joined along their rear, upper and front portions. The shroud assembly has an open bottom portion and an at least partially open lower front portion and is configured to receive a portion of the circular blade within said shroud assembly. A movable front section is arranged at the front portion of the shroud assembly, which front section is arranged to cover the at least partially open lower front portion and to extend to a position adjacent or in contact with the surface during a cutting operation.

At least one side portion of the movable front section is attached onto the shroud assembly by a guide means. A lower end portion of the movable front section can comprise a surface contacting member, which can comprise one or more rotatable members or a low friction member. Further details of the shroud assembly not described above can be found in the detailed description below.

The invention further relates to a debris guiding device for a shroud assembly. As described above, the shroud assembly comprises first and second opposed and spaced apart side walls joined along their rear, upper and front portions. The shroud assembly has an open bottom portion and being configured to receive a portion of a circular blade within the shroud assembly. The debris guiding device comprises a first deflector member arranged behind the circular blade, which first deflector member extends transversely from the first side wall at least up to a recess in the second side wall.

Preferably, the first deflector member extends from a relatively higher position at the first side wall to a relatively lower position at the second side wall. A lower portion of the first deflector member located adjacent the second side wall extends transversely outside the second side wall, and thus outside the cut made by the circular blade in the surface. Also, the first deflector member can extend out through the recess in the second side wall. According to a further example, a second deflector member can be arranged spaced from the first deflector member and facing the outer surface of the second side wall. The second deflector member extends away from the second side wall from a position above the recess and downwards past the end of the first deflector member. Further details of the shroud assembly not described above can be found in the detailed description below.

The invention will be described in further detail below applied to a trench cutting machine.

BRIEF DESCRIPTION OF DRAWINGS

In the following text, the invention will be described in detail with reference to the attached drawings. These schematic drawings are used for illustration only and do not in any way limit the scope of the invention. In the drawings:

FIG. 3 shows a side view of the trench cutting machine in FIG. 1 during transport;

EMBODIMENTS OF THE INVENTION

Figure 1:
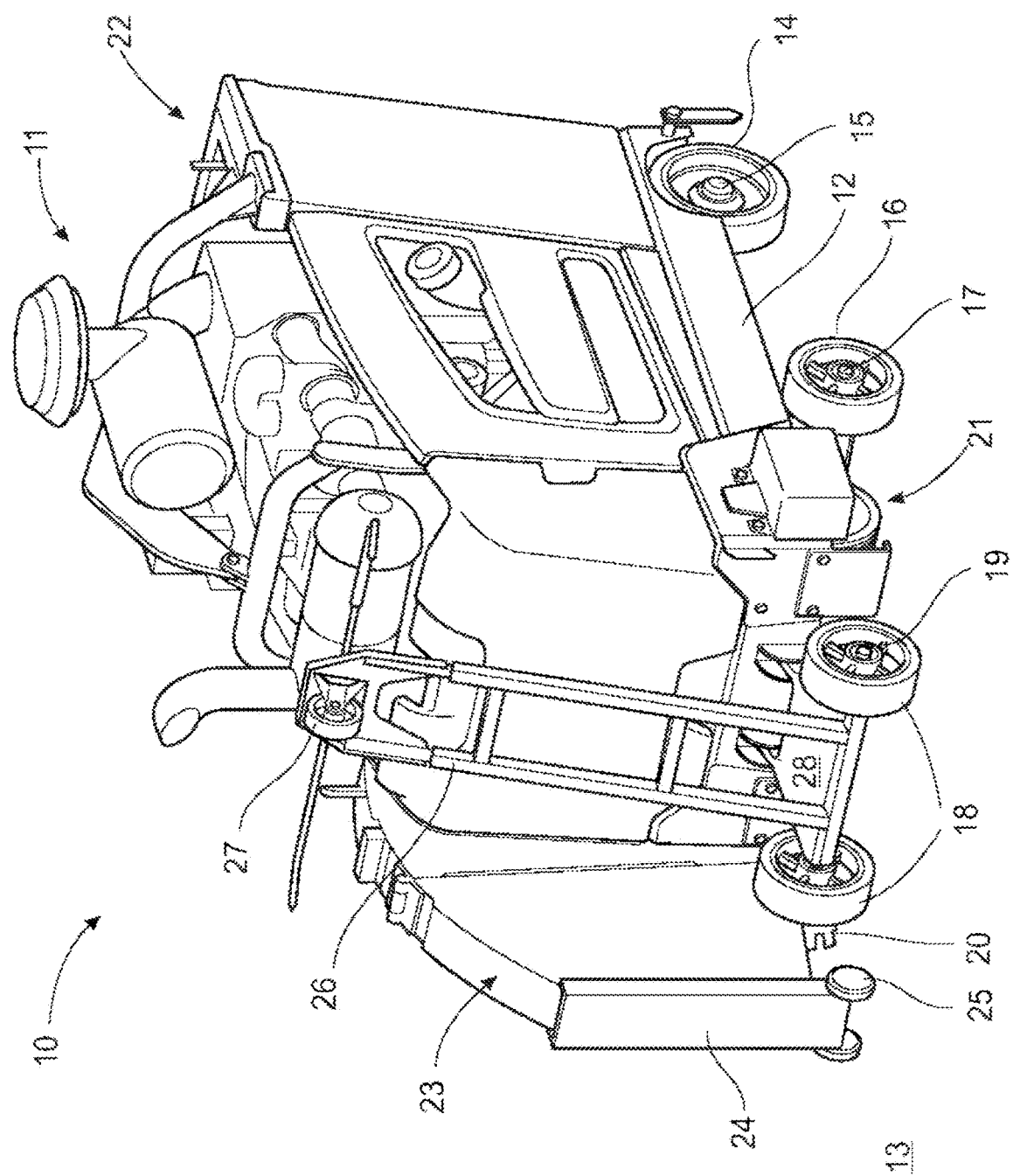
FIG. 1 shows a perspective front view of a self-propelled trench cutting machine according to a first embodiment of the invention.
Figure 2:
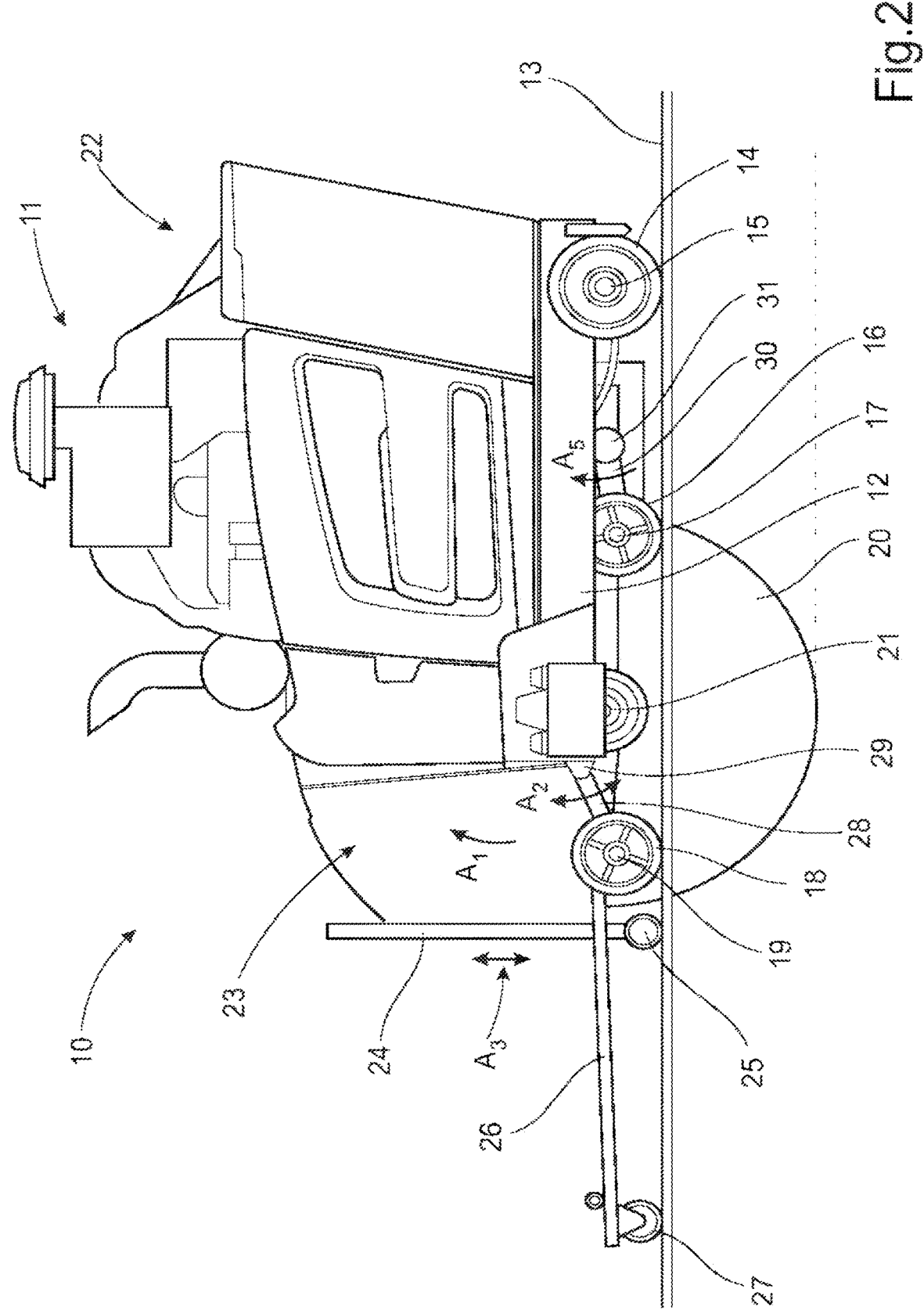
FIG. 2 shows a side view of the trench cutting machine in FIG. 1 during a cutting operation.

FIG. 1 shows a perspective front view of a self-propelled trench cutting machine 10 powered by a prime mover 11, which in this example is an internal combustion machine. The trench cutting machine 10 includes a mobile frame 12 supported for movement across a substantially even surface 13 by a plurality of ground engaging wheels 14, 16, 18. FIG. 1 shows a machine comprising a rear axle 15 provided with a first pair of wheels 14, a front axle 17 provided with a second pair of wheels 16, and an auxiliary front axle 19 provided with a third pair of wheels 18. In FIG. 1, the first and second pairs of wheels 14, 16 are identical and located on opposite sides of the frame 12. During a cutting operation the frame 12 is supported by the rear axle 15 and the auxiliary front axle 19, as shown in FIGS. 1 and 2. During transport the frame 12 is supported by the rear axle 15 and the front axle 17, as shown in FIG. 3. In order to displace the frame 12 between a first, cutting position into a second, transport position the front axle 17 can be displaced relative to the frame. This feature will be described in connection with FIG. 3 below.

A rotatable circular blade assembly 20, hereinafter termed circular blade is mounted to and extends forwardly of the frame 12. The circular blade 20 is rotated about an axis 21 located transverse to the frame 12 parallel to and between the front axle 17 and the auxiliary front axle 19. At least a portion of the outer periphery of the circular blade 20 extends forwards of the frame 12 in the longitudinal direction thereof. The circular blade 20 can comprise one or more circular cutters mounted side by side to form an assembly having a size suitable for cutting a trench having a predetermined width and depth in the surface 13. The prime mover 11 is mounted in a chassis 22 on the frame 12 for providing motive power to the circular blade 20, via a gearbox (not shown), and at least one of the ground engaging wheels 14, 16, 18. In the example shown in FIG. 1, the prime mover 11 is arranged to drive the wheels 14 of the rear axle 15. A pointer is shown folded up against the front of the chassis 22, which pointer is used for aiming the machine 10 along a line or marker on the surface 13 in front of the machine 10. In this example the pointer comprises a frame 26 and a guide wheel 27, wherein the frame 26 is pivotable between a folded up position, shown in FIG. 1, and a folded down position, shown in FIG. 2. Here, the frame 26 is mounted to the front of the machine adjacent the auxiliary front axle 19.

During a cutting operation the prime mover 11 is arranged to drive the rear axle 15 to propel the frame and the circular blade 20 to cut a vertical trench in the surface 13 at the front of the trench cutting machine 10. The circular blade 20 is rotated in a direction opposite to the direction of rotation of the wheels 14 18 during forward movement of the trench cutting machine 10. This direction of rotation is indicated by the arrow A1 in FIG. 2, whereby the circular blade 20 performs a cutting action commonly referred to as "up-cut".

The trench cutting machine 10 further comprises a shroud assembly 23 mounted to the side of the frame 12, wherein a portion of the shroud extends in front of the frame 12. The shroud assembly 23 is arranged to collect debris discharged from the circular blade 20 and receives a portion of the circular blade 20 within enclosing wall portions. The shroud assembly 23 is described in further detail in connection with FIGS. 4A and 4B below. The shroud assembly 23 comprises a movable front section 24 arranged to cover an at least partially open lower front portion in front of the circular blade 20. The movable front section 24 is mounted in a sliding guide or roller guide (not shown) on or both sides, allowing it to slide relative to a front surface of the shroud 23 as the distance between the surface 13 and the lower portion of the shroud changes. FIG. 1 indicates that the movable front section 24 can have longitudinal side edges extending over the side surfaces of the shroud assembly 23. The guides can be mounted inside and be protected by these side edges.

The movable front section 24 is arranged to extend to a position adjacent the surface 13 during a cutting operation. The embodiment in FIG. 1 has a front section 24 provided with a pair of ground contacting wheels 25 in contact with the surface 13.

FIG. 2 shows a side view of the self-propelled trench cutting machine 10 in FIG. 1. As described above, the trench cutting machine 10 includes a mobile frame 12 supported for movement across a substantially even surface 13 by a plurality of ground engaging wheels 14, 16, 18. The figure shows the rear axle 15 provided with a first pair of wheels 14, the front axle 17 provided with a second pair of wheels 16, and the auxiliary front axle 19 provided with a third pair of wheels 18. During a cutting operation the frame 12 is supported by the rear axle 15 and the auxiliary front axle 19, wherein the auxiliary front axle is mounted to the front end of a sub-frame 28 attached to the frame 12. The sub-frame 28 can be pivoted about a pivot 29 attached to a front portion of the frame 12 as indicated by the arrow A2. In this way, the third pair of wheels 18 on the auxiliary front axle 19 can be adjusted between an upper position, for a maximum depth of cut for the circular blade 20, and a lower position, for a minimum depth of cut for the circular blade 20. The position of the third pair of wheels 18 can be adjusted in fixed steps or be set in any position between the upper and lower end positions. This adjustment is preferably, but not necessarily, performed prior to the start of a cutting operation, the required depth of cut is usually known and as a rule constant during the operation.

The positioning of the sub-frame 28 and the third pair of wheels 18 can be carried out by a suitable actuator (not shown) mounted to the frame 12 or chassis 22 and powered by the prime mover 11. The actuator can comprise any suitable mechanically, hydraulically or electrically driven device and is controllable by an operator. Non-limiting examples of such suitable devices are e.g. ball-screw arrangement, hydraulic cylinders or electric servo motors. Unless it is desired to adjust the position of the sub-frame 28 during a cutting operation, it can be advantageous that that actuator is self-locking or can be locked in a set position, in order to reduce the power output required from the prime mover to maintain the position. Alternatively, the actuator can be a suitable mechanical linkage or gearing that can be operated and set/locked manually be the operator.

During a cutting operation where the third pair of wheels 18 are in the upper position, the weight of the trench cutting machine 10 is taken up by the rear axle 15 and the auxiliary front axle 19. The second pair of wheels 16 on the front axle 17 can be located in contact with or adjacent the surface 13, but is not supporting the trench cutting machine 10.

FIG. 2 further shows a side view of the shroud assembly 23 and the movable front section 24 arranged to cover an at least partially open lower front portion in front of the circular blade 20. As described above, the movable front section 24 is mounted in a sliding guide or roller guide (not shown) on or both sides, allowing it to slide relative to a front surface of the shroud 23 as the distance between the surface 13 and the lower portion of the shroud changes, as indicated by the arrow A3. FIG. 2 also shows that the ground contacting wheels 25 are in contact with the surface 13 during a cutting operation.

FIG. 3 shows a side view of the trench cutting machine 10 in FIG. 1 during transport. In its transport position, the front part of the frame 12 of the trench cutting machine 10 is lifted until the circular blade 20 clears the ground and is positioned above the surface 13. When the front part of the frame 12 is lifted, the movable front section 24 is arranged to extend to its lower end position, as indicated by the arrow A3 in FIG. 3. The front axle 17 is mounted to the front end of an arm 30 attached to the frame 12. The arm 30 can be pivoted about a pivot 31 attached to a lower portion of the frame 12 as indicated by the arrow A4. In this way, the second pair of wheels 16 on the front axle 17 can be adjusted between an extended, raised position, as shown in FIG. 3, and a retracted, lowered position, as shown in FIG. 2.

Consequently, in order to displace the frame 12 between a first, cutting position into a second, transport position the front axle 17 is displaced relative to the frame 12 by a pivoting movement of the arm 30 in the direction of the arrow A4, shown in FIG. 3. Similarly, to displace the frame 12 between the second, transport position into the first, cutting position the front axle 17 is displaced relative to the frame 12 by a reversed pivoting movement of the arm 30 in the direction of the arrow A5, shown in FIG. 2.

The raising and lowering of the frame 12 by the pivoting movement of the arm 30 can be carried out by a suitable actuator (not shown) mounted to the frame 12 or chassis 22 and powered by the prime mover 11. The actuator can comprise any suitable mechanically, hydraulically or electrically driven device and is controllable by an operator. Alternatively, the actuator can be a suitable mechanical linkage or gearing that can be operated and set/locked manually be the operator.

Figure 4A:
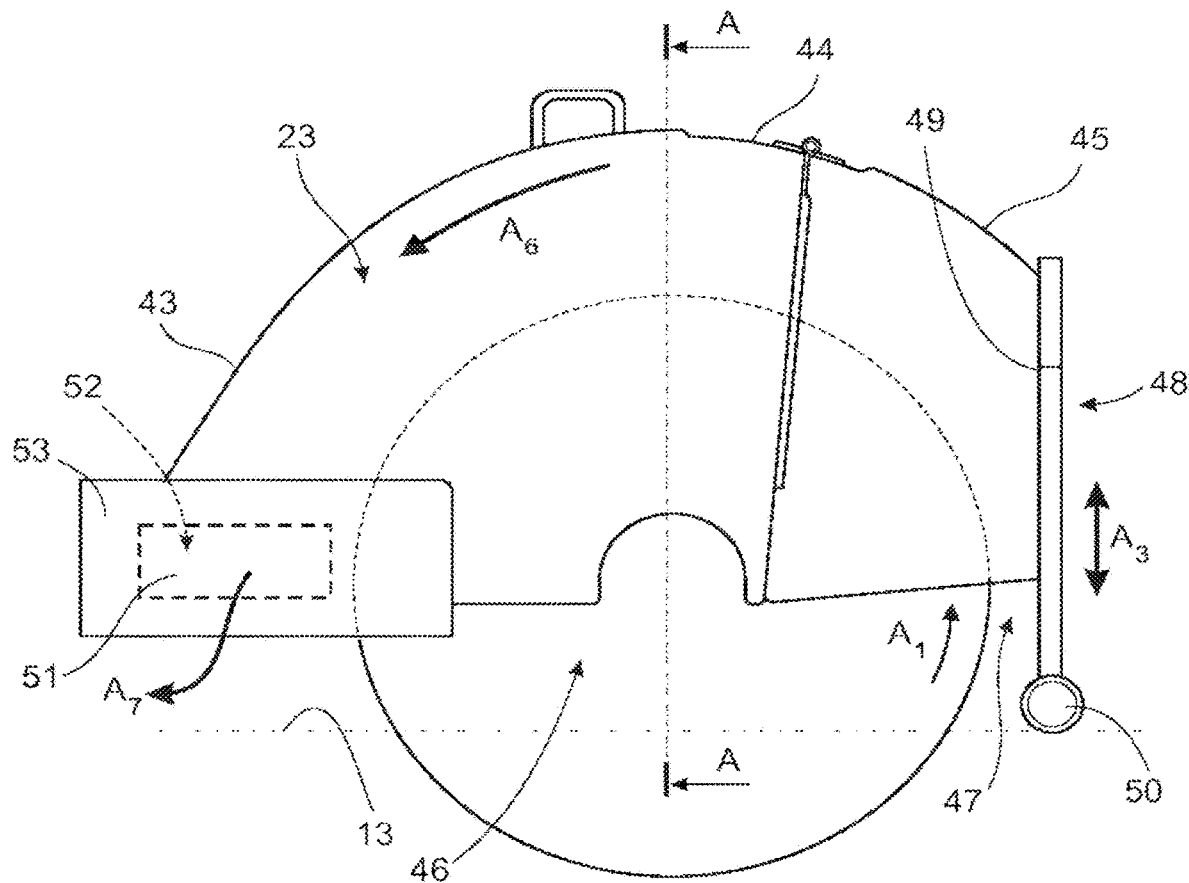
FIG. 4A-B show a longitudinal cross-section through alternative shroud assemblies of the trench cutting machine in FIG. 1.

FIG. 4A shows a shroud assembly 23 as indicated in FIG. 1. As described above, the shroud assembly 23 is arranged to collect debris discharged from circular blade during a cutting operation and receives a portion of the circular blade 20 within enclosing wall portions. The shroud assembly 23 comprises a first and second opposed and spaced apart side walls 41, 42 (see FIG. 4B), which side walls are joined with transverse walls. The transverse walls comprise a rear portion 43, an upper portion 44 and a front portion 45. The shroud assembly 23 has an open bottom portion 46 and an at least partially open lower front portion 47, and is configured to receive a major portion of the circular blade 20 located above the surface 13 within said shroud assembly 23. The partially open lower front portion 47 is covered by a movable front section 48 mounted in a sliding guide 49 or roller guide (not shown) on or both sides, allowing the movable front section 48 to slide relative to the front portion 45 of the shroud 23 as the distance between the surface 13 and the lower portion of the shroud adjacent the open bottom portion 46 changes. The movable front section 48 is arranged to extend to a position adjacent the surface 13 during a cutting operation, as indicated by the arrow A3 in FIG. 4A. In the same way as in the embodiment in FIG. 1 the front section 48 is provided with a pair of ground contacting wheels 50 in contact with the surface 13.

FIG. 4A further shows an arrangement for controlling the spread and deposition of debris during an up-cut operation performed by the circular blade. Debris cut by the circular blade is displaced out of the cut trench by cutting members along the outer periphery of the circular blade. The centrifugal forces created by the rotary movement of the circular blade will cause the debris to be displaced upwards and rearwards in a radial gap formed by the outer periphery of the circular blade and the inner surfaces of the rear, upper and front portions 43, 44, 45 of the shroud assembly 23, as shown by the arrow A6. Debris travelling along these surfaces, from the front towards the rear of the shroud assembly, will strike a deflector member 51 arranged behind the circular blade.

Figure 4B:
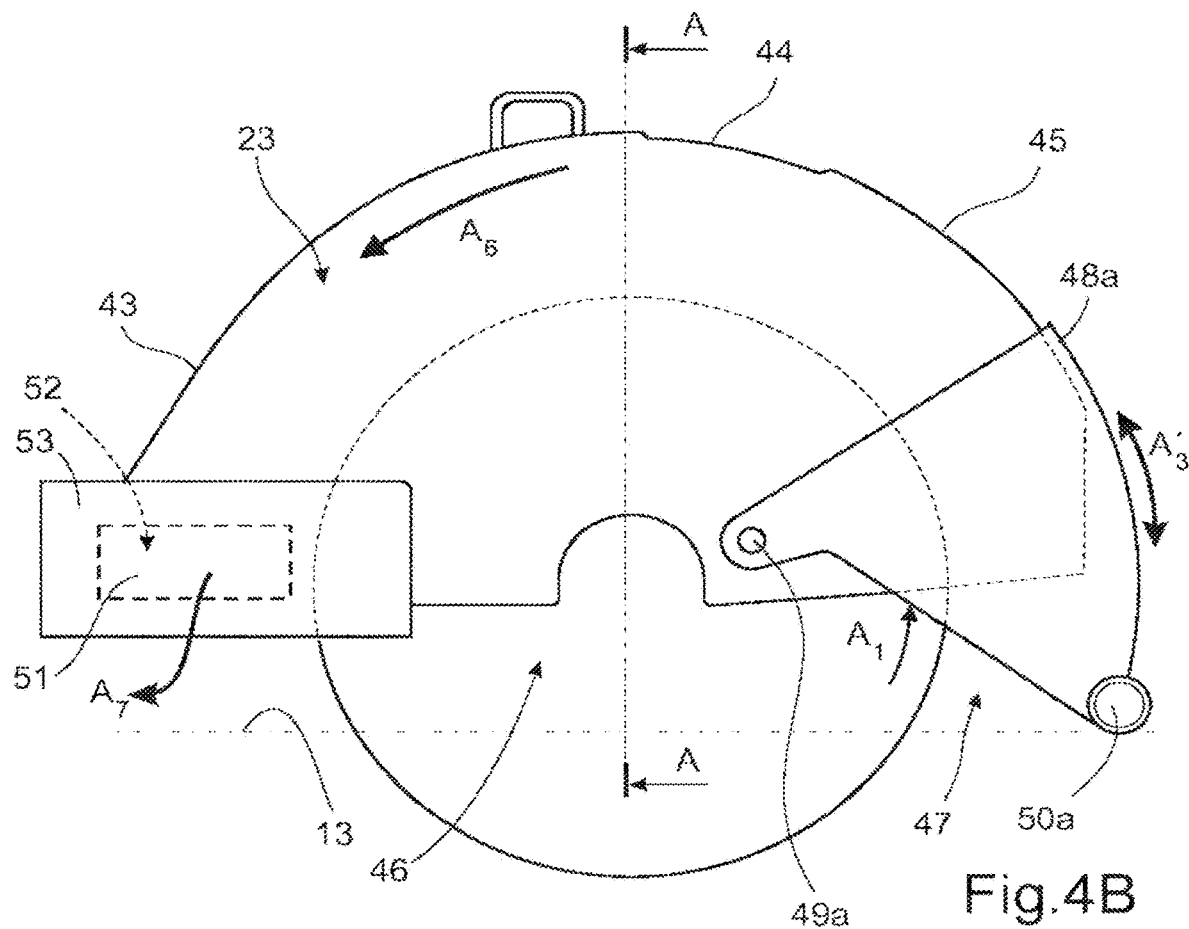

FIG. 4B shows an alternative shroud assembly 23 as indicated in FIG. 1. As described above, the shroud assembly 23 is arranged to collect debris discharged from circular blade during a cutting operation and receives a portion of the circular blade 20 within enclosing wall portions. The shroud assembly 23 comprises a first and second opposed and spaced apart side walls 41, 42 (see FIG. 4B), which side walls are joined with transverse walls. The transverse walls comprise a rear portion 43, an upper portion 44 and a front portion 45. The shroud assembly 23 has an open bottom portion 46 and an at least partially open lower front portion 47, and is configured to receive a major portion of the circular blade 20 located above the surface 13 within said shroud assembly 23.

The partially open lower front portion 47 is covered by a movable front section 48a mounted on a pivot 49a or in a part-circular guide (not shown) on or both sides, allowing the movable front section 48a to be rotated about the pivot 49a for displacement relative to the front portion 45 of the shroud 23 as the distance between the surface 13 and the lower portion of the shroud adjacent the open bottom portion 46 changes. The pivot 49a in FIG. 4B is located immediately in front of the central axis of the circular blade. However, this pivot can be located in any suitable position on the shroud assembly 23, adjacent or remote from the central axis of the circular blade in order to provide a desired extension and retraction of the movable front section 48a The movable front section 48a is arranged to extend to a position adjacent the surface 13 during a cutting operation, as indicated by the arrow A3' in FIG. 4B. In the same way as in the embodiment in FIG. 1 the front section 48a is provided with a pair of ground contacting wheels 50a in contact with the surface 13.

Figure 4C:
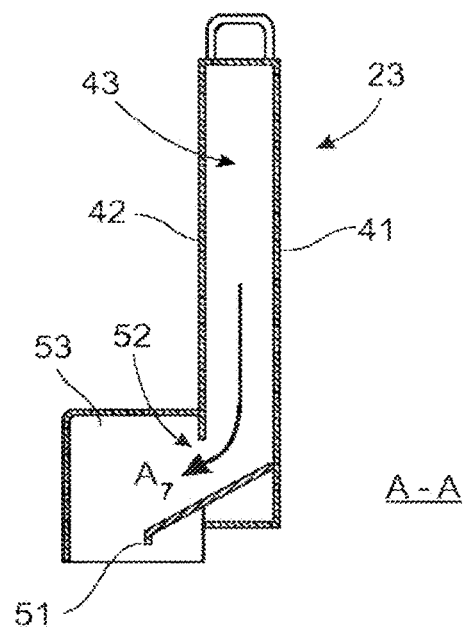
FIG. 4C shows a transverse, cross-section through the shroud assembly in FIGS. 4A-B, and FIGS. 5A-F show a number of schematic plan views of alternative wheel arrangements for a trench cutting machine according to the invention.

FIG. 4C shows a transverse, vertical cross-section through the shroud assembly in FIGS. 4A and 4B. As seen in FIGS. 4A and 4B, the deflector member is arranged between the side walls 41, 42 and extends across the radial gap between the circular blade and the inner surfaces of the rear portion 43. According to the embodiment shown in FIG. 4B it can be seen that the deflector member 51 extends transversely from a first side wall 41, up to and through a recess 52 in the second side wall 42. Debris travelling through the shroud 23 will strike the deflector member 51 and be guided out through the recess 52, as shown by the arrow A7. In order to facilitate removal of debris the deflector member 51 is arranged at an angle to form a downward angled surface from the first side wall 41 towards the second side wall 42 and its recess 52. Alternatively, the deflector member 51 can be shaped as a curved surface suitable for guiding the debris towards the recess 52. Preferably, a lower portion of the deflector member 51 adjacent the second side wall 42 extends a predetermined distance past the main extension of the second wall 42. This ensures that debris is deposited to one side of an open trench cut in the surface 13, in order to prevent debris from falling back into the cut trench. In this example, the recess 52 in the second side wall 42 is partially enclosed by a receptacle 53 mounted on the outer surface of the second side wall 42. The receptacle 53 has an upper wall, an outer wall as well as a front and a rear wall. Debris exiting the recess 52 along the first deflector member 51 will be prevented from being thrown out of the recess 52 in an uncontrollable manner as it will strike the walls of the receptacle 53 before falling out through the open bottom of the receptacle. This receptacle is an optional arrangement that can limit the spread of the debris and ensure a more controlled deposit along the cut trench.

Figure 5A:
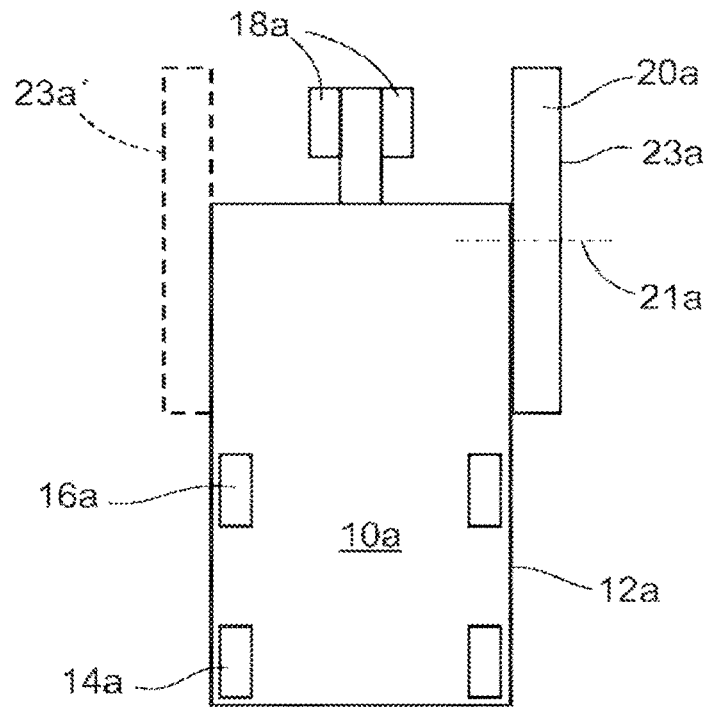

FIGS. 5A-5F show a number of schematic plan views of alternative wheel arrangements for a trench cutting machine according to the invention. FIG. 5A corresponds to the basic wheel arrangement for the first embodiment of the invention, as shown in FIG. 1. The trench cutting machine 10a includes a mobile frame 12a supported for movement across a substantially even surface by a plurality of ground engaging wheels 14a, 16a, 18a. FIG. 5A shows a machine comprising a rear axle provided with a first pair of wheels 14a and a front axle provided with a second pair of wheels 16a wherein both pairs of wheels 14a, 16a are located on opposite sides of the machine 10a. An auxiliary front axle is provided with a third pair of wheels 18a In FIG. 5A at least the first pair of wheels 14a on the rear axle is driven, although it is also possible to drive either or both of the second and/or third pairs of wheels 16a, 18a. As indicated in FIG. 5A, the wheels 18a of the auxiliary front axle are located in front on the rotary axle 21a of a circular blade 20a located within a shroud assembly 23a.

An alternative shroud assembly 23a' in FIG. 5A shows that the circular blade can be located on either side of the machine 10a This alternative location of the circular blade is applicable on each of the alternative embodiments shown in FIGS. 5A-5E.

Figure 5B:
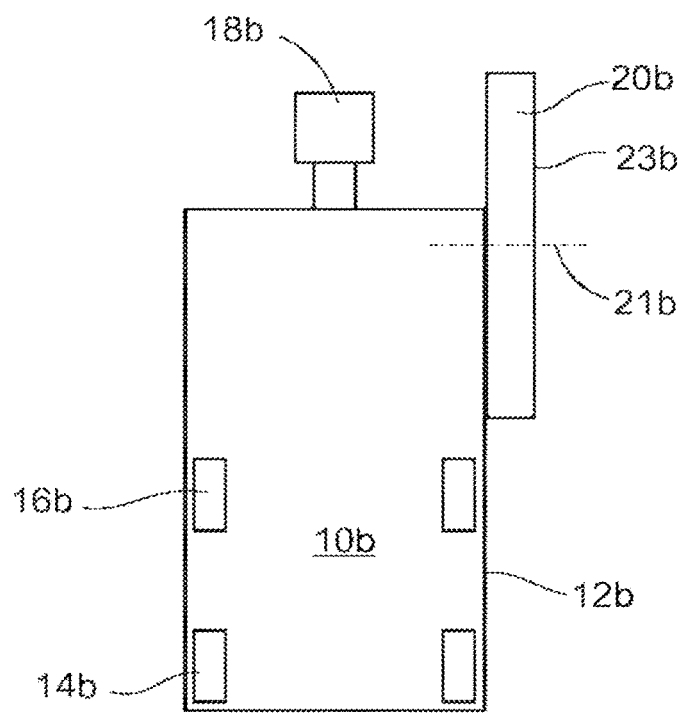

FIG. 5B shows the basic wheel arrangement for a second embodiment of the invention. The trench cutting machine 10b includes a mobile frame 12b supported for movement across a substantially even surface by a plurality of ground engaging wheels 14b, 16b, 18b FIG. 5B shows a machine comprising a rear axle provided with a first pair of wheels 14b and a front axle provided with a second pair of wheels 16b wherein both pairs of wheels 14b, 16b are located on opposite sides of the machine 10b. An auxiliary front axle is provided with a third, single wheel 18b located on the central longitudinal axis of the vehicle 10b In FIG. 5B, at least the first pair of wheels 14b on the rear axle are driven, although it is also possible to drive either or both of the second pairs of wheels 16b and/or the third, auxiliary wheel 18b As indicated in FIG. 5B, the wheel 18b of the auxiliary front axle is located in front on the rotary axle 21a of a circular blade 20a located within a shroud assembly 23a.

Figure 5C:
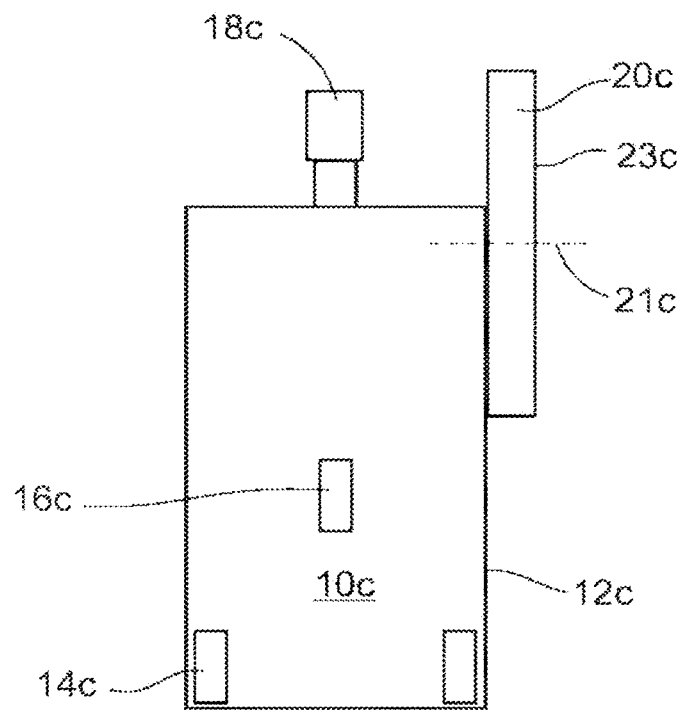

FIG. 5C shows the basic wheel arrangement for a third embodiment of the invention. The trench cutting machine 10c includes a mobile frame 12c supported for movement across a substantially even surface by a plurality of ground engaging wheels 14c, 16c, 18c FIG. 5C shows a machine comprising a rear axle provided with a first pair of wheels 14c and a front axle provided with a second, single wheel 16c located on the central longitudinal axis of the vehicle 10c The first pair of wheels 14c on the rear axle is located on opposite sides of the machine 10c. An auxiliary front axle is provided with a third, single wheel 18c located on the central longitudinal axis of the vehicle 10c. In FIG. 5C, at least the first pair of wheels 14c on the rear axle is driven although it is also possible to drive either or both of the second and/or third wheels 16c, 18c. As indicated in FIG. 5C, the wheel 18c on the auxiliary front axle is located in front on the rotary axle 21c of a circular blade 20c located within a shroud assembly 23c.

Figure 5D:
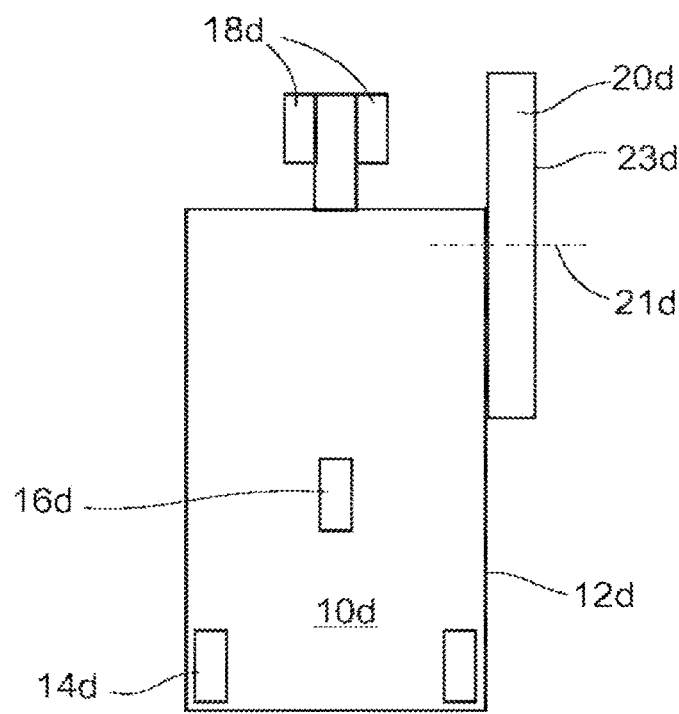

FIG. 5D shows the basic wheel arrangement for a fourth embodiment of the invention. The trench cutting machine 10d includes a mobile frame 12d supported for movement across a substantially even surface by a plurality of ground engaging wheels 14d, 16d, 18d. FIG. 5D shows a machine comprising a rear axle provided with a first pair of wheels 14d and a front axle provided with a second, single wheel 16d located on the central longitudinal axis of the vehicle 10d. The first pair of wheels 14d on the rear axle is located on opposite sides of the machine 10d. An auxiliary front axle is provided with a third pair of wheels 18d. In FIG. 5D, at least the first pair of wheels 14d on the rear axle are driven, although it is also possible to drive either or both of the second wheel 16d and/or the third pair of wheels 18d. As indicated in FIG. 5D, the wheels 18d of the auxiliary front axle are located in front on the rotary axle 21d of a circular blade 20d located within a shroud assembly 23d.

Figure 5E:
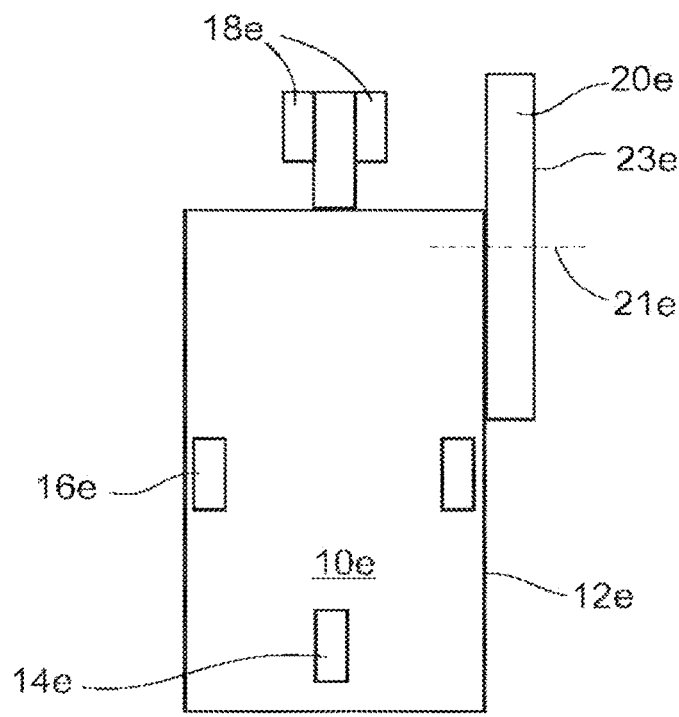

FIG. 5E shows the basic wheel arrangement for a fifth embodiment of the invention. The trench cutting machine 10e includes a mobile frame 12e supported for movement across a substantially even surface by a plurality of ground engaging wheels 14e, 16e, 18e. FIG. 5E shows a machine comprising a rear axle provided with a first, single wheel 14e and a front axle provided with a second pair of wheels 16e. The first, single wheel 14e is located on the central longitudinal axis of the vehicle 10c, while the second pair of wheels 16e is located on opposite sides of the machine 10a. An auxiliary front axle is provided with a third pair of wheels 18e In FIG. 5E, at least the first, single wheel 14e on the rear axle is driven, although it is also possible to drive either or both of the second and/or third pairs of wheels 16e, 18e. As indicated in FIG. 5E, the wheels 18e of the auxiliary front axle are located in front on the rotary axle 21e of a circular blade 20e located within a shroud assembly 23e.

Figure 5F:
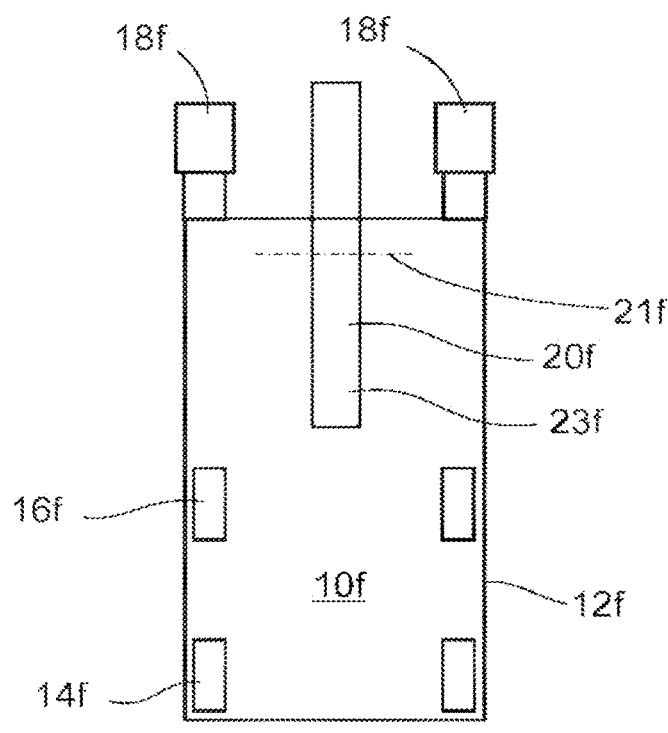

FIG. 5F shows the basic wheel arrangement for a sixth embodiment of the invention. The trench cutting machine 10f includes a mobile frame 12f supported for movement across a substantially even surface by a plurality of ground engaging wheels 14f, 16f, 18f. FIG. 5F shows a machine comprising a rear axle provided with a first pair of wheels 14f and a front axle provided with a second pair of wheels 16f wherein both pairs of wheels 14f, 16f are located on opposite sides of the machine 10f. An auxiliary front axle is provided with a third pair of wheels 18f. In FIG. 5F, at least the first pair of wheels 14f on the rear axle is driven, although it is also possible to drive either or both of the second and/or third pairs of wheels 16f, 18f. As indicated in FIG. 5F, the wheels 18f of the auxiliary front axle are located in front of the rotary axle 21f of a circular blade 20f located within a shroud assembly 23f. As opposed to the embodiments in FIGS. 5A-5E, the wheels 18f of the auxiliary front axle are located on either side of the shroud assembly 23f, on opposite sides of the vehicle 10f. In an alternative embodiment of the vehicle 10f, the driven rear axle can be provided with a single wheel in the same way as illustrated in FIG. 5E.

The invention is not limited to the above embodiments, but may be varied freely within the scope of the claims.

What is claimed is:

1. A trench cutting machine for making a cut in a surface, the trench cutting machine comprising:
   a frame comprising a rear axle and a front axle, wherein the rear axle or the front axle is operably coupled to a first wheel and a second wheel;
   a rotatable blade mounted to the frame, the blade having an axis of rotation located parallel to and in front of the front axle during a cutting operation; and
   a prime mover for driving the blade;
   wherein the front axle is vertically adjustable relative to the frame between a first position where the blade is lifted clear of the surface, and a second position where the blade is extended downwards from the frame to cut a cut depth into the surface; and
   wherein the frame further comprises an auxiliary front axle located in front of the axis of rotation of the blade, wherein moving the front axle from the first position into the second position causes the auxiliary front axle to support the frame on the surface with the rear axle and maintains the cut depth into the surface.

2. A trench cutting machine according to claim 1, wherein the direction of rotation of the blade when cutting is opposite to a direction of rotation of the wheels during forward movement of the trench cutting machine.

3. A trench cutting machine according to claim 1, wherein the rear axle is operably coupled to the first wheel and the second wheel; and
   wherein the auxiliary front axle is operably coupled to a third wheel and a fourth wheel.

4. A trench cutting machine according to claim 1, wherein the auxiliary front axle is adjustable relative to the frame to set the cut depth to less than a full cut depth.

5. A trench cutting machine according to claim 4, wherein the auxiliary front axle is adjustable about a pivot relative to the frame.

6. A trench cutting machine according to claim 4, wherein the auxiliary front axle is steplessly adjustable or adjustable in fixed steps relative to the frame.

7. A trench cutting machine according to claim 1, wherein the auxiliary front axle is fixed relative to the frame to set the cut depth to a full cut depth.

8. A trench cutting machine according to claim 1, wherein the auxiliary front axle comprises a third wheel disposed adjacent the blade, on side of the blade, or in front of an outer periphery of the blade.

9. A trench cutting machine according to claim 1, wherein the rear axle is operably coupled to the first wheel and the second wheel; and
   wherein the auxiliary front axle is operably coupled to a third wheel and a fourth wheel during a cutting operation.

10. A trench cutting machine according to claim 1 further comprising a shroud assembly mounted on the frame to guide debris discharged from the blade, the shroud assembly comprising a first side wall and a second side wall, the first side wall and the second side wall being opposed, spaced apart, and joined along rear, upper, and front portions;
    wherein the shroud assembly comprises an open bottom portion and an at least partially open lower front portion;
    wherein the shroud assembly is configured to receive a portion of the blade within the shroud assembly; and
    wherein a movable front section is disposed at the front portion of the shroud assembly, the movable front section being configured to cover the at least partially open lower front portion and extend to a position adjacent or in contact with the surface during a cutting operation.

11. A trench cutting machine according to claim 10, wherein a side portion of the movable front section is attached onto the shroud assembly by a guide means or by a pivot.

12. A trench cutting machine according to claim 10, wherein a lower end portion of the movable front section comprises a surface contacting member or a rotatable member.

13. A trench cutting machine according to claim 10, wherein a first deflector member is disposed behind the blade, the first deflector member extending transversely from the first side wall at least to a recess in the second side wall.

14. A trench cutting machine according to claim 13, wherein the first deflector member extends out through the recess in the second side wall.

15. A trench cutting machine according to claim 1, wherein the front axle is affixed to a front axle arm that is configured to pivot about a front axle pivot for the front axle to be vertically adjustable; and
    wherein the auxiliary front axle is affixed to an auxiliary front axle arm that is configured to pivot about an auxiliary front axle pivot for the auxiliary front axle to support the frame on the surface with the rear axle and maintain the cut depth into the surface.

16. A trench cutting machine according to claim 15, wherein the movement of the front axle about the front axle pivot causes the front axle to rotate closer to or further from the rear axle.

17. A trench cutting machine according to claim 1 further comprising a guide wheel disposed forward of the auxiliary front axis.

18. A trench cutting machine for making a cut in a surface, the trench cutting machine comprising:
    a frame coupled to a rear axle, a front axle, and an auxiliary front axle; wherein the rear axle is coupled to at least one rear wheel, the front axle is coupled to at least one front wheel, and the auxiliary front axle is coupled to at least one auxiliary front wheel; and
    a rotatable blade mounted to the frame;
    wherein the front axle is pivotable relative to the frame about a front axle pivot to cause the frame to pivot about the rear axle between a first position and a second position, the front axle pivot and the rear axle being different pivot axes;
    wherein, in the first position, the blade is lifted clear of the surface; and
    wherein, in the second position, the blade is positioned to cut a cut depth into the surface based on a position of the auxiliary front axle.

19. A trench cutting machine for making a cut in a surface, the trench cutting machine comprising:
    a frame coupled to a rear axle, a front axle, and an auxiliary front axle; wherein the rear axle is coupled to at least one rear wheel, the front axle is coupled to at least one front wheel, and the auxiliary front axle is coupled to at least one auxiliary front wheel; and
    a rotatable blade mounted to the frame;
    wherein the front axle is vertically adjustable relative to the frame to cause the frame to transition between a first position and a second position;

wherein, in the first position, the blade is lifted clear of the surface, the frame is supported by the front axle and the rear axle, and the front auxiliary axle is not in contact with the surface; and wherein, in the second position, the blade is positioned to cut a cut depth into the surface based on a position of the auxiliary front axle, the auxiliary front axle supports the frame with the rear axle on the surface, and the front axle is retracted and provides no support to the frame on the surface.

\* \* \* \* \*